No. 839,396.　　　　　　　　　　　　　　　　　　　　PATENTED DEC. 25, 1906.
C. KREMER.
APPARATUS FOR SEPARATION OF SOLID MATTERS FROM SEWAGE, &c.
APPLICATION FILED MAR. 30, 1906.

3 SHEETS—SHEET 1.

WITNESSES:
George J. Schoerlank
O. H. Berrigan

INVENTOR,
CHRISTOPH KREMER,
by H. van Oldenmeel
Attorney.

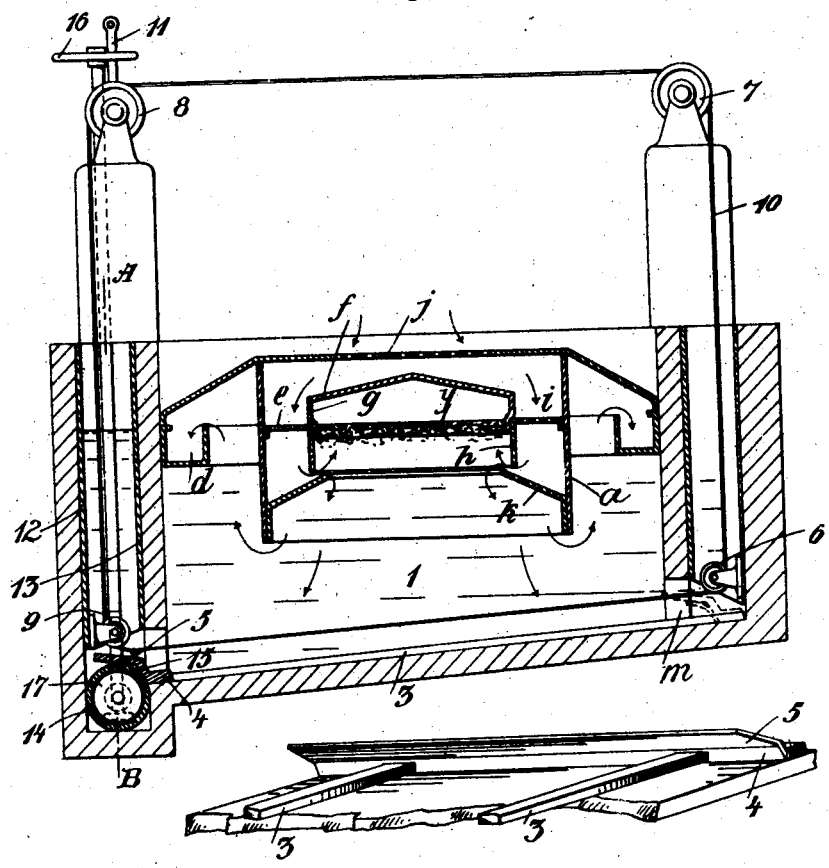

No. 839,396. PATENTED DEC. 25, 1906.
C. KREMER.
APPARATUS FOR SEPARATION OF SOLID MATTERS FROM SEWAGE, &c.
APPLICATION FILED MAR. 30, 1906.

3 SHEETS—SHEET 3.

WITNESSES:
George G. Schoenlank
W. H. Berrigan

INVENTOR.
CHRISTOPH KREMER,
by H. van Oedenruel
Attorney.

UNITED STATES PATENT OFFICE.

CHRISTOPH KREMER, OF BERLIN, GERMANY, ASSIGNOR TO GESELLSCHAFT FÜR ABWÄSSERKLARUNG, MIT BESCHRÄNKTER HAFTUNG, OF BERLIN, GERMANY.

APPARATUS FOR SEPARATION OF SOLID MATTERS FROM SEWAGE, &c.

No. 839,396.     Specification of Letters Patent.     Patented Dec. 25, 1906.

Application filed March 30, 1906. Serial No. 308,845.

*To all whom it may concern:*

Be it known that I, CHRISTOPH KREMER, a subject of the King of Prussia, German Emperor, residing at Lindenstrasse 111, Berlin, Germany, have invented new and useful Improvements in Apparatus for Separation of Solid Matters from Sewage, &c., of which the following is a specification.

This invention relates to apparatus which are especially useful with the apparatus protected by United States Patents Nos. 751,303, 700,056, and 823,688.

The object of the present invention is to provide an apparatus for assuring separation of solid matters from sewage, the effluent of factories, waste waters, &c.

My new apparatus is designed to receive the sludge or sewage and to effect a separation, principally by gravity, of the lighter constituents, such as fatty particles, from the heavier ingredients, such as sand, and to produce the apparatus in the form most desired by me I provide the same with means for removing the heavier settled ingredients as desired.

In order that this invention may be better understood, I now proceed to describe the same, reference being had to the accompanying drawings, and to the letters and figures marked thereon.

Figure 1:
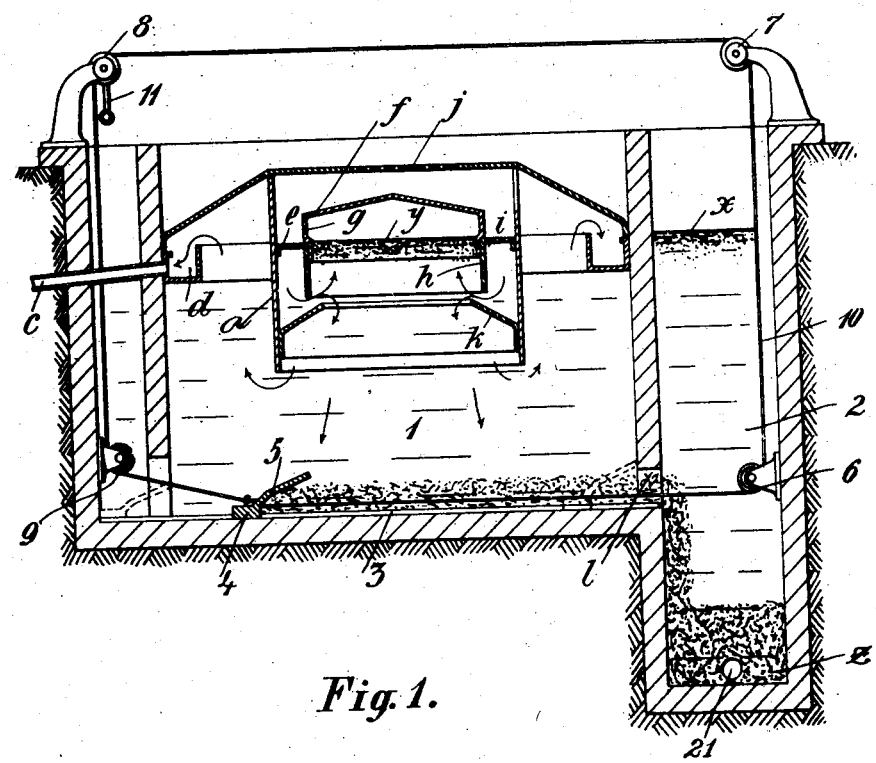
Figure 4:
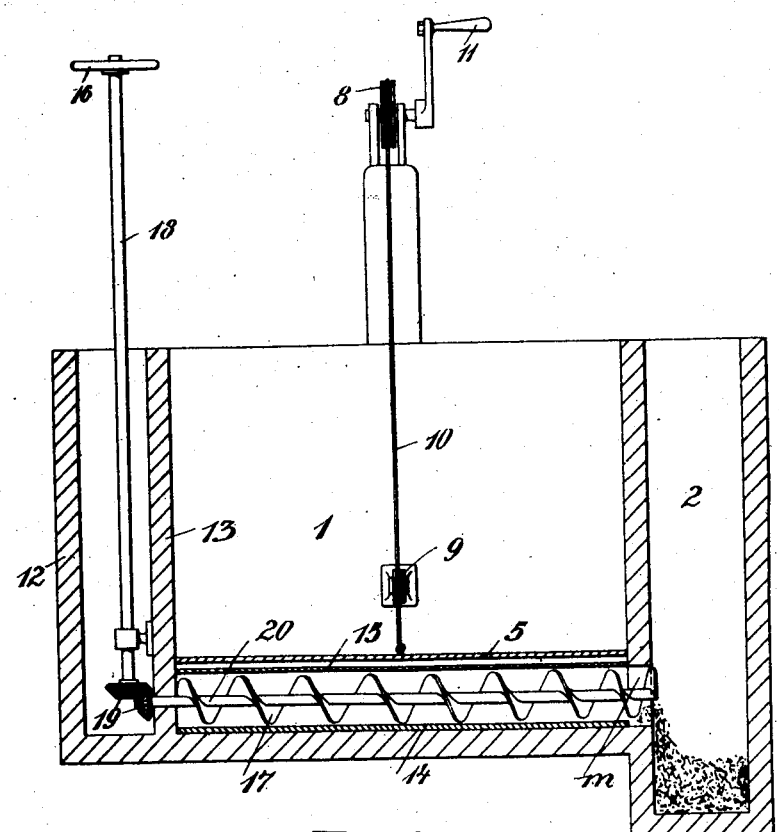

Figure 1 shows a vertical section through apparatus constructed according to my invention. Fig. 2 is a fragmentary view of a form of scraper which may be used with the apparatus of Fig. 1. Fig. 3 shows a vertical section through a modified form of apparatus, and Fig. 4 shows a vertical section on the line B of the apparatus illustrated in Fig. 3.

As is well known, when town sewage or the like is passed through clarifying or settling apparatus—for instance, apparatus such as described or shown in the United States patents heretofore mentioned—the solids separate in the water according to the respective specific gravities of the ingredients, the lighter rising and accumulating until removed by a ladle or otherwise, and the heavier ingredients, sinking in the fluid, must also be removed from time to time.

The apparatus devised by me and shown in Fig. 1 has a main tank or chamber 1, constructed of any suitable material in any desired manner and opening at *l* into another and smaller compartment 2, having its floor formed as a collecting-pit or disposed at a lower level than the floor of chamber 1. The form of the chamber 1 and of the compartment 2 may be any desired.

Upon the bottom or the floor of the tank or chamber 1 parallel rails 3 3 are secured in such position as to serve as guides for a scraper 4 and keep the same close to the floor. The form of scraper preferred is illustrated in Fig. 2, which shows a beam 4 disposed at right angles to the rails 3 3 and having openings whereby said beam slides along said rails. Entirely along one edge the beam 4 is provided with an upwardly-extending and overhanging portion or hood 5. A rope 10 is connected to the opposite sides of said beam, and said rope is arranged to pass around the pulleys 6, 7, and 9 and to be coiled upon a roll 8, operated by a handle 11. When said handle is operated, the scraper will be traversed along the bottom of tank 1. In Fig. 1 the scraper is shown by heavy lines in an intermediate position, and the extreme advanced and retracted positions of said scraper are shown by dotted lines.

In the upper part of the tank or compartment 1 I provide a draining device which is also employed as a preliminary separator and as a means wherein the lighter ingredients of the sludge are accumulated. Such device comprises a vessel *a*, provided with an internal cylindrical device, such as ring *h*, in any suitable manner, so that an annular channel *i* is formed, through which the sewage passes. Further, the vessel *a* is provided around its inner periphery and below the part *h* with a projecting rim *k*, which slants upward, so that the waste waters which pass through a sieve-like cover *j* into the vessel *a* and through the annular channel *i* and a sieve *e*, arranged therein, are forced by the projecting rim *k* to ascend into the dome *fg*, fitted on the cylindrical device *h*, in order to leave there the main quantity of the fat or lighter ingredients contained in such waste waters. An overflow-channel *d*, having an outflow-pipe *c*, is provided for carrying off the water.

With the apparatus shown in Fig. 1 I avail myself of the preferred process which is carried out near the factory or the like, thus saving cost of great lengths of pipes heretofore employed and utilizes the decomposition of the fertilizer ingredients in the sewage without the drawbacks (such as generation of objectionable odors) of the earlier processes, and my apparatus also gives the further advantage of being continuous, thus increasing the yield, and is also carried out under water, whereby the odors are decreased.

The sewage or sludge is poured into the apparatus at the perforated plate $j$ and is deflected by the exterior surface of the dome $f$ to the annular channel $i$, passing through the perforations of the ring $e$ and being deflected upwardly by the baffle $k$. The lighter ingredients—for instance, fats, oils, &c.—will rise and accumulate within the dome, forming a floating layer, as shown at $y$, while the heavier ingredients will sink and accumulate upon the floor of the tank 1. Water passing through the apparatus will, after separation of the lighter and the heavier ingredients therefrom, be discharged through the channel $d$ and pipe $c$ to any suitable point.

For removal of the layer $y$ at any time it is necessary only to lift the plate $j$ and the dome $fg$. For removal of the heavier settled material it is necessary only to grasp the handle 11 and by rotating the roller 8 cause the rope 10 to pull the scraper 5 (held to the bottom of the tank and guided by the rails 3) toward the channel $l$. The overhanging edge of the scraper will prevent the deposited material from riding over the scraper, and such deposited material will be forced through the channel $l$ into the smaller compartment 2, where the heavy ingredients will accumulate, as shown at Z, in the pit of the compartment 2. As shown at the right-hand side of Fig. 1, the overhanging edge of the scraper 5 (when in its most advanced portion) serves to completely close the channel $l$.

The sludge or sewage removed from tank 1 to compartment 2 begins to ferment and decompose in the water in said compartment, and the fermentation and decomposition take place all the more rapidly, as the sludge or sewage is in accumulated condition and is mixed with a relatively small quantity of water, differing in this particular from previous decomposition apparatus, in which there was only a small percentage of sludge in a great quantity of water. In consequence of the fermentation and decomposition in the compartment 2 and of the accompanying gas and heat a large proportion of the sludge rises and forms a floating layer X. The residue Z at the bottom of the compartment will consist principally of sand or like material not subject to decomposition.

At any time during the clarifying operations, which proceed without interruption in the compartment 2, further deposits of sludge may be supplied from the tank 1, and as the floating layer X and the settled material may be removed (the latter through the opening 21) at any intervals desired the process will be carried on without any interruption or stoppage.

A great advantage from the hygienic point of view resulting from my apparatus is found in the fact that none of the products of decomposition find their way into the water discharged from the tank 1 and allowed to flow into streams or rivers.

Another form of apparatus according to my invention is shown in Figs. 3 and 4 and illustrates the employment of a conveyer for transferring the sludge from settling-tank 1 to the compartment 2, wherein decomposition and fermentation take place.

As seen in Fig. 3, I may provide the tank 1 with a floor which slopes to the channel (shown at the left) leading to an intermediate compartment formed by walls 12 and 13 and wherein is located a helical conveyer 17, partially housed within a casing 14, provided with an opening extending along the entire length of the casing and coinciding with the channel heretofore mentioned. Normally the scraper is drawn to the position indicated by dotted lines in Fig. 3, and the opening in the casing 14 is unobstructed. The sludge precipitated in the tank 1 will therefore settle upon the floor of the tank 1 and will move by gravity toward the channel and toward the casing 14.

The scraper 5 may be provided, as shown in Figs. 3 and 4, with a long strip 15, extending throughout the entire length of the scraper and preferably curved, as shown in Fig. 3, to correspond with the curvature of the casing 14 and to fit within the opening of said casing and completely inclose the conveyer when the scraper is fully advanced (by rotation of roller 8 and pull of rope 10) to force the precipitated sludge into the conveyer-casing.

As shown in Fig. 4, the conveyer 17 is arranged to deliver the sludge into compartment 2. For this purpose the rod or axle 20 of the conveyer-screw is driven by bevel-gears 19 and by the upright 18, provided with hand-wheel 16. The opening $m$, Fig. 4, through which the conveyer delivers the sludge, should correspond in diameter to said conveyer.

What I claim is—

1. An apparatus for separation of matter from sewage, &c., comprising a tank wherein the heavier constituents of the sewage sink and containing a device for separating and retaining the lighter constituents, a second tank having an open connection with the first-named tank, a conveyer located in said open connection, a scraper movable along the floor of the first-named tank for transferring sunken solids to and for closing said open connection, and means for operating said scraper and said conveyer separately.

2. An apparatus for separation of matter from sewage, &c., comprising a tank wherein the heavier constituents of the sewage sink and containing a device for separating and retaining the lighter constituents, a second tank having an open connection with the first-named tank, a conveyer located in said open connection and in a casing open along one side thereof, a scraper movable along the floor of the first-named tank for transferring sunken solids to and for closing the opening in said casing, and means for operating said scraper and said conveyer separately.

3. An apparatus for the separation of matter from sewage, &c., comprising a tank wherein the heavier constituents of the sewage sink and containing a device for separating and retaining the lighter constituents, rails secured upon the floor of said tank, a second tank having an open connection with the first-named tank, a broad scraper having an overhanging upper end and slidably engaging the rails aforesaid and movable along the floor of the first-named tank for transferring sunken solids to and for closing said open connection, and means for operating said scraper.

In testimony whereof I have signed my name to this specification in the presence of two subscribing witnesses.

CHRISTOPH KREMER.

Witnesses:
WOLDEMAR HAUPT,
HENRY HASPER.